United States Patent [19]

Dye et al.

[11] 4,428,336

[45] Jan. 31, 1984

[54] INLET VALVE ASSEMBLY FOR INTERNAL COMBUSTION ENGINES

[75] Inventors: Anthony O. Dye, Girton; David Littlechild, Oakington, both of England

[73] Assignee: Epicam Limited, London, England

[21] Appl. No.: 15,238

[22] Filed: Feb. 26, 1979

Related U.S. Application Data

[63] Continuation of Ser. No. 854,384, Nov. 23, 1977, abandoned, which is a continuation-in-part of Ser. No. 685,671, May 12, 1976, abandoned.

[30] Foreign Application Priority Data

May 28, 1975 [GB] United Kingdom .............. 23332/75

[51] Int. Cl.³ .............................................. F01L 3/06

[52] U.S. Cl. .............................. 123/188 VA; 123/306

[58] Field of Search ......... 123/188 R, 188 AF, 188 S, 123/188 VA, 188 M, 306, 590

[56] References Cited

U.S. PATENT DOCUMENTS

| | | | |
|---|---|---|---|
| 1,471,955 | 10/1923 | Grieve | 123/188 VA |
| 1,539,167 | 5/1925 | Diel et al. | 123/188 VA |
| 1,624,850 | 4/1927 | Steele | 123/188 VA |
| 1,956,235 | 4/1934 | Hofferberth | 123/188 VA |
| 1,969,202 | 8/1934 | Bugaud | 123/306 |
| 2,111,549 | 3/1938 | Blanchet | 123/188 VA |
| 3,090,370 | 5/1963 | Kimball | 123/188 VA |

FOREIGN PATENT DOCUMENTS

| | | | |
|---|---|---|---|
| 269922 | 3/1928 | Italy | 123/188 M |

*Primary Examiner*—Craig R. Feinberg
*Assistant Examiner*—W. R. Wolfe
*Attorney, Agent, or Firm*—Oblon, Fisher, Spivak, McClelland & Maier

[57] ABSTRACT

The invention provides an improved inlet valve assembly for use in internal combustion engines. Gas distribution mechanism are provided to divide the gas passing between the valve and the valve seat into a plurality of circumferentially spaced jets each having a radial component of motion. Preferably, the jets are inclined to the radial direction.

41 Claims, 10 Drawing Figures

INLET VALVE ASSEMBLY FOR INTERNAL COMBUSTION ENGINES

CROSS REFERENCE TO RELATED APPLICATIONS

This is a continuation application of application Ser. No. 854,384, filed on Nov. 23, 1977 now abandoned, which was a continuation in-part application of application Ser. No. 685,671, filed on May 12, 1976, now abandoned.

The present invention relates to internal combustion engines and in particular provides an improved inlet valve assembly principally, but not exclusively, for use in a four-stroke spark-ignition reciprocating piston engine (hereinafter referred to as a "petrol engine").

DESCRIPTION OF THE PRIOR ART

Attempts have been made over many years to improve the efficiency of combustion of the air/fuel mixture in petrol engines. In recent years, there has been a requirement to decrease the fuel content of the mixture to a level where the air/fuel ratio is substantially above the stoichiometric ratio (i.e. that ratio at which there is just sufficient air to allow all of the fuel to burn). Such a lean mixture, especially at about 20:1 gives a very low emission of unburnt hydrocarbons and nitrogen oxides. However, to the best of our knowledge it has not been possible to extend significantly the lean limit of petrol engines without substantial redesign of the engine.

A major and unsolved problem in petrol engines is the cycle-to-cylce variations in combustion conditions in the same cylinder operating under identical load, speed and throttle opening. These variations give rise to substantial variations in peak pressure levels from one cycle to the next. Winsor and Patterson (SAE 730086,1973) have proposed a model which postulates a critical flame radius increment in which mixture motion variations near the spark electrodes create the cyclic combustion variations. They have concluded that those variations can be reduced by reducing the critical burning distance which they believe to be a function of eddy size in the turbulent air/fuel mixture in the cylinder. Although they were aware of previous attempts to control turbulence, in particular by inducing swirl in the mixture, they concluded that "at this time means for reducing the eddy size in an engine are not known".

Recent substantial increases in petroleum fuel costs and predictions concerning exhaustion of natural petroleum resources have resulted in a world-wide effort to produce petroleum fuel engines of increased efficiency in terms of fuel consumption whilst retaining acceptable power output performance. Numerous modifications and variations to petrol engines have been proposed but only those of a relatively expensive nature have been able to produce any significant increase in fuel economy whilst retaining acceptable power output. To the best of our knowledge, none of the modifications or variations proposed have been capable of providing a petrol engine which is relatively inexpensive and which enables the engine to provide a performance in terms of economy combined with power output comparable with a compression-ignition reciprocating engine (viz. a diesel engine).

SUMMARY OF THE INVENTION

It is an object of this invention to provide a petrol engine of improved fuel economy and acceptable power output. In particular, it is an object of the invention to improve the fuel economy of a petrol engine under light loads, which are the loads encountered during the vast majority of normal running conditions of an automobile engine. More particularly, it is an object of the invention to provide, as a preferred embodiment, a petrol engine having comparable performance in terms of fuel economy combined with power output with that of a diesel engine.

It is a further object of the invention to extend the lean limit at which a petrol engine can be operated under normal conditions.

It is another object of the invention to decrease cycle-by-cycle variations in a petrol engine and to increase the compression ratio for a given octane level.

It is yet another object to reduce the eddy size in the gas mixture in a petrol engine cylinder.

These objects are fulfilled at least in part by provision of an inlet valve assembly which can be incorporated into a petrol engine of conventional design without substantial modification to the engine. It will be appreciated however that the valve assembly of the invention can be used in internal combustion engines other than petrol engines (as defined above).

According to the present invention, there is provided an inlet valve assembly for an internal combustion engine, especially for a petrol engine, which assembly includes a valve, especially a poppet valve, a seat for the valve and gas distribution mechanism for dividing gas passing between the valve in its open position and the seat into a plurality of circumferentially spaced jets each having a radial component of motion. It is believed that in a petrol engine the jets create gas turbulence in the form of small eddies in the cylinder which decays to form a pattern of isotropic turbulence such that at the time of combustion, substantially all of the eddies are sufficiently small as to reduce cycle-to-cycle combustion variations.

The gas jets are relatively small and of relatively high velocity compared with unrestricted gas flow through the annular gap between the open valve and its seat.

The total cross-sectional area of the jets is determined having regard to the swept volume of the cylinder into which the valve assembly of the invention controls ingress of gas. This area is expressed as a so-called "charge restriction factor" ("CRF") which we define as being:

Swept volume of cylinder in cc.

Total cross-sectional flow area of jets in $cm^2$. Suitably, the CRF is in the range 80 to 150, especially 95 to 135 and more especially 105 to 125. In terms of the inlet valve assembly for a conventional petrol engine, the total cross-sectional area of the jets will usually constitute 50 to 25%, preferably 50 to 30% and especially 45 to 35% of the total area between the valve in its open position and its seat. Conveniently, the width of each jet in the circumferential direction is 0.03 to 0.11 inches, preferably 0.05 to 0.09 inches and especially about 0.07 inches.

Each jet has a component of motion in the radial direction (relative to the valve and seat) but it is preferred that the jet is inclined to that direction. Suitably, the included angle between the radial direction and each jet is in the range 15° to 45°, preferably 25° to 35° and especially about 30°. The jets can be arranged in one or more layers in the or each of which layers the jets deviate from that direction in a common angular direction and by a common angle. The jets in adjacent layers, when there are two or more layers, can deviate from the radial direction at different common angles and/or in different directions. It is presently preferred that such jets in adjacent layers should deviate at the same angle and in the same angular direction.

The gas distribution mechanism can comprise a ring having a plurality of passages leading to respective circumferentially spaced outlet ports. Suitably, such a ring can be obtained by machining circumferentially spaced grooves having, for example, parallel sides into one face of a metal ring. Two or more rings can be superimposed to provide layers of jets as described above. It is preferred that the length of the grooves should be at least twice their width and usually the length will be limited only by constructional requirements.

Usually, the gas distributing mechanism will be carried by the valve for movement therewith, although it could be attached or otherwise associated with the seat and the valve movable relative thereto. In the case of one or more rings as described above, the ring or rings preferably extend coaxially from a poppet valve head in the direction of the valve stem. The or each ring can extend directly from or be radially spaced from the stem over a radial distance up to the edge of the conical surface of head, provided that where there are two or more rings gas access is provided to each ring. The depth of the ring or rings in the axial direction should preferably be at least equal to the valve lift (i.e. the maximum distance under normal operation between the valve and its seat). In an alternative arrangement using the ring(s), the ring(s) could depend coaxially from the valve seat and the valve head be cup-shaped having a circumferential skirt extending axially in the direction of the stem to cover the ring(s) when the valve is closed, the edge of said skirt being adapted to contact the seat in a gas-tight manner.

As mentioned previously, the invention has particular application to petrol engines and hence it is a preferred feature that the valve assembly is adapted for use as an inlet valve in such an engine. However, the valve assembly of the invention could have other applications such as to the air inlet of a diesel (i.e. compression-ignition reciprocating engine) to enable the fuel content of the air/fuel ratio to be increased thereby increasing power output for a given engine size.

In the case of application to a petrol engine, the valve assembly of this invention will reduce the variation in combustion conditions from cycle-to-cycle and permit the use of leaner air/fuel mixtures. Further, it will permit the use of lower octane fuels for a given compression ratio or of increasing the ratio for a given fuel. However, restriction of the air/fuel mixture by passage through the gas distribution mechanism will reduce the fuel charge to the cylinder in a naturally aspirated engine. If desired or necessary this reduction in charge readily can be overcome by using a supercharger which is particularly suited to a petrol engine fitted with inlet valve assemblies according to the present invention because no reduction has to be made to the compression ratio compared with the engine prior to installing the modified valve assemblies. Strict control of the air/-fuel/mixture to each cylinder is required to ensure maximum efficiency and hence it is much preferred that the engine should be fuel injected or multi-carburetted.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
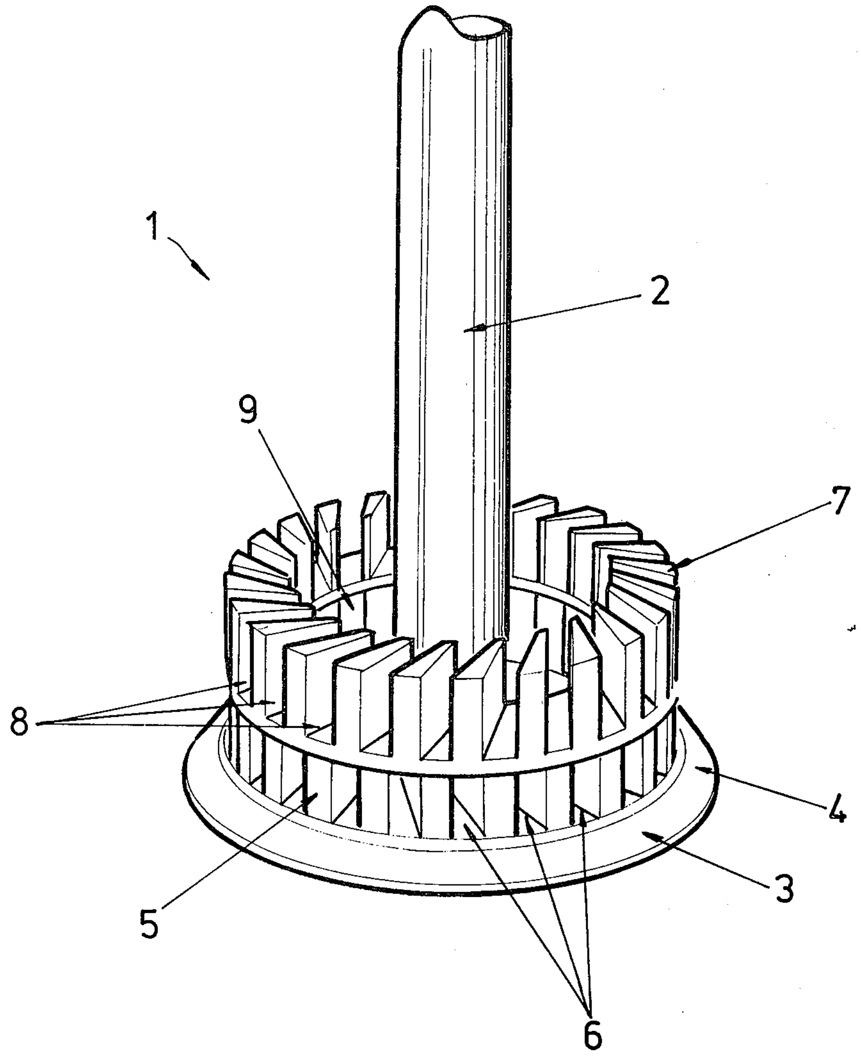
FIG. 1 is a perspective view of a poppet valve provided with two gas jetting rings.

Referring to FIG. 1, a poppet valve generally indicated at 1 includes a stem 2 terminaing in a head 3 having a conical upper surface 4 to form a gas-tight fit in a co-operating seat (not shown). A first ring 5 of the same metal as the valve head is welded coaxially of the head to extend axially from the upper surface thereof. This ring 5 has a plurality of equally spaced parallel sided grooves or passages 6 cut into its upper face and each groove 6 deviates from the radial direction in an anticlockwise or counterclockwise (when viewed from above i.e. from upstream) direction by an angle of 30°. A second ring 7 also of the same material as the head 3 is welded coaxially to the upper face of the ring 5. This ring 7 also has a plurality of equally spaced parallel sided grooves 8 cut into its upper surface, the grooves being equal in number to those in ring 5 such that walls located therebetween are joined together at a base portion thereof and are open ended at a portion opposite the base portion. The walls also radially outwardly increase in width. The grooves in ring 7 deviate from the radial direction by 30° but in the clockwise direction as viewed from above and are offset relative to the grooves in ring 5. Each ring 5, 7 has a larger internal diameter than the external diameter of stem 2 so as to provide an annular gap 9 between the stem and the rings.

Figure 2:
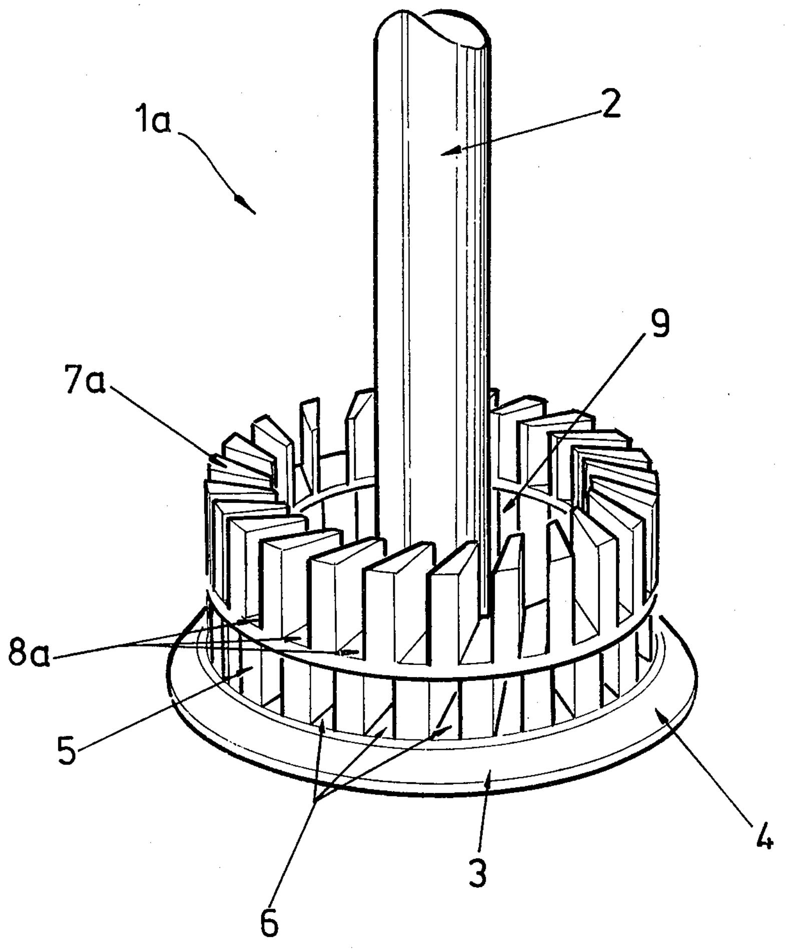
FIG. 2 is a perspective view of a preferred modification of the poppet valve of FIG. 1.

The valve 1*a* of FIG. 2 differs from that of FIG. 1 in that the grooves 6 in the lower ring 5 deviate from the radial direction by 30° in the clockwise direction as viewed from above (i.e. from upstream).

Figure 3:
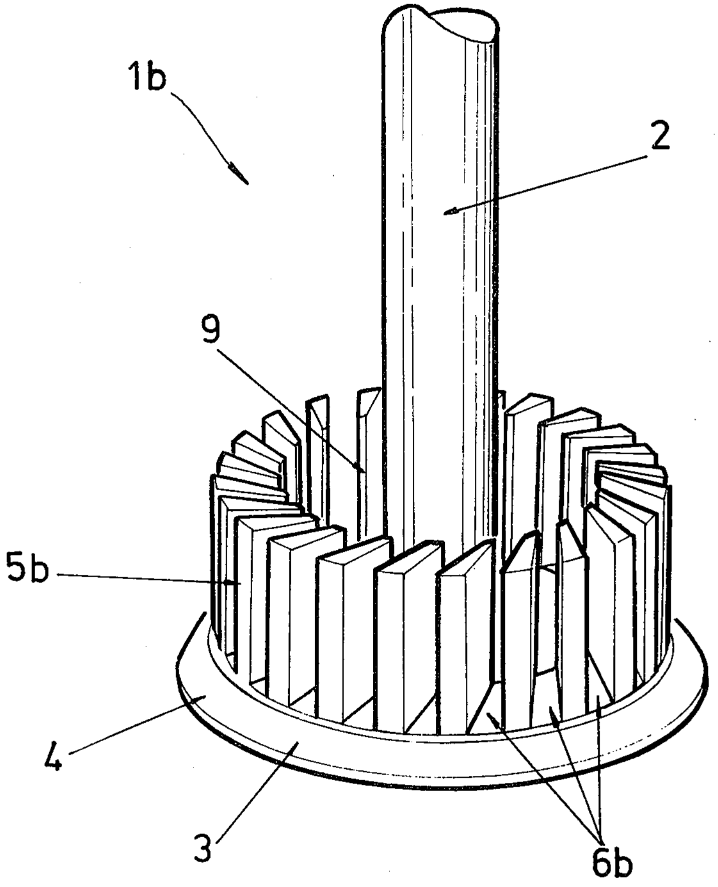
FIG. 3 is a perspective view of another preferred modification of the poppet valve of FIG. 1.

The valve 1*b* of FIG. 3 differs from that of FIG. 1 in that rings 5 and 7 are replaced by a single ring 5*b* of substantially the same axial length as rings 5 and 7 and grooves 6b are substantially twice the axial length as grooves 6.

A number of valves were manufactured and tested and the results of the relevance of those tests are given below. In each case the stem 2 and head 3 were conventional poppet valves intended for the engine used in the test, and the axial length of the ring(s) was substantially equal to the valve movement. For convenience, the valves were given identifying codes as set forth in Table I below:

TABLE I

| Code | Valve type | Grooves per ring | Passage width (inches) | Blockage* (%) | CRF | Graph line Number (FIGS. 7 to 10) |
|---|---|---|---|---|---|---|
| Standard | Conventional | none | — | — | — | 10 |
| Basic | Valve 1 (see FIG. 1) | 23 | 0.07 | 58% | 111 | 11 |
| 2TS | Modified valve 1 with grooves 6, 8 radially directed | 23 | 0.07 | 58% | 111 | 12 |
| 2TA | Valve 1a (see FIG. 2) | 23 | 0.07 | 58% | 111 | 13 |
| 2TA 2B | Valve 1a | 21** | 0.07 | 61% | 122 | 14 |
| ITA FB | Valve 1b (see FIG. 3) | 23 | 0.07 | 56% | 107 | 15 |
| ITA 2B | Valve 1b | 21** | 0.07 | 61% | 122 | 16 |
| 2TA 16J | Valve 1a | 16 | 0.085 | 64.5% | 131 | 17 |
| 2TA 18J | Valve 1a | 18 | 0.085 | 60% | 116 | 18 |

*Proportion of total circumferential area of blank ring(s)remaining after machining grooves.
**2TA and ITA FB valve types respectively with two adjacentgrooves blocked-off in the or each ring.

In a first series of tests, "basic" valve 1 was fitted to cylinder No. 4 of a 2.5 liter six-cylinder petrol-injected engine with a 9.5:1 compression ratio (Triumph 2.5 P.I. engine) in which cylinders Nos. 2, 3 and 6 had been blanked off and the pistons removed. A similar poppet valve having four rings including a first pair corresponding to rings 5, 7 but narrower and a second identical pair superimposed on the first pair was fitted to cylinder No. 5. The remaining cylinder (No. 1) was fitted with the "standard" valve provided in the engine as supplied by the manufacturers. The engine was run on a test bed with natural aspiration at wide open throttle and loaded to the required engine speed.

The pressure in each cylinder was individually monitored continuously with a pressure transducer recording the output by means of U.V. trace. The tests were carried out with 5 star petrol (Shell) at 2000 r.p.m. using air/fuel ratios of 13:1 (normal) and 16:1 (lean). The results obtained are set forth in Table II.

TABLE II

| | Normal Mixture | | | Weak Mixture | | |
|---|---|---|---|---|---|---|
| Cylinder | 1 | 4 | 5 | 1 | 4 | 5 |
| Mean Peak Pressure (MPP) | 3.667 | 3.723 | 3.700 | 1.597 | 2.765 | 2.621 |
| Standard Deviation (SD) | 0.338 | 0.129 | 0.216 | 0.297 | 0.218 | 0.238 |
| $\frac{SD \times 100}{MPP}$ | 9.22 | 3.46 | 5.84 | 18.60 | 7.88 | 9.08 |

In another test, "basic" valves 1 were fitted to each of cylinders 1, 4 and 5 of the same engine which was otherwise run as above at 2500 r.p.m. at air/fuel ratios between 12.5:1 to the lean limit. A comparative test was carried out using the "standard" valves originally fitted to the engine instead of valves 1. The conditions in the two tests were identical except that the ignition timing was always set for maximum power before each test run.

Figure 4:
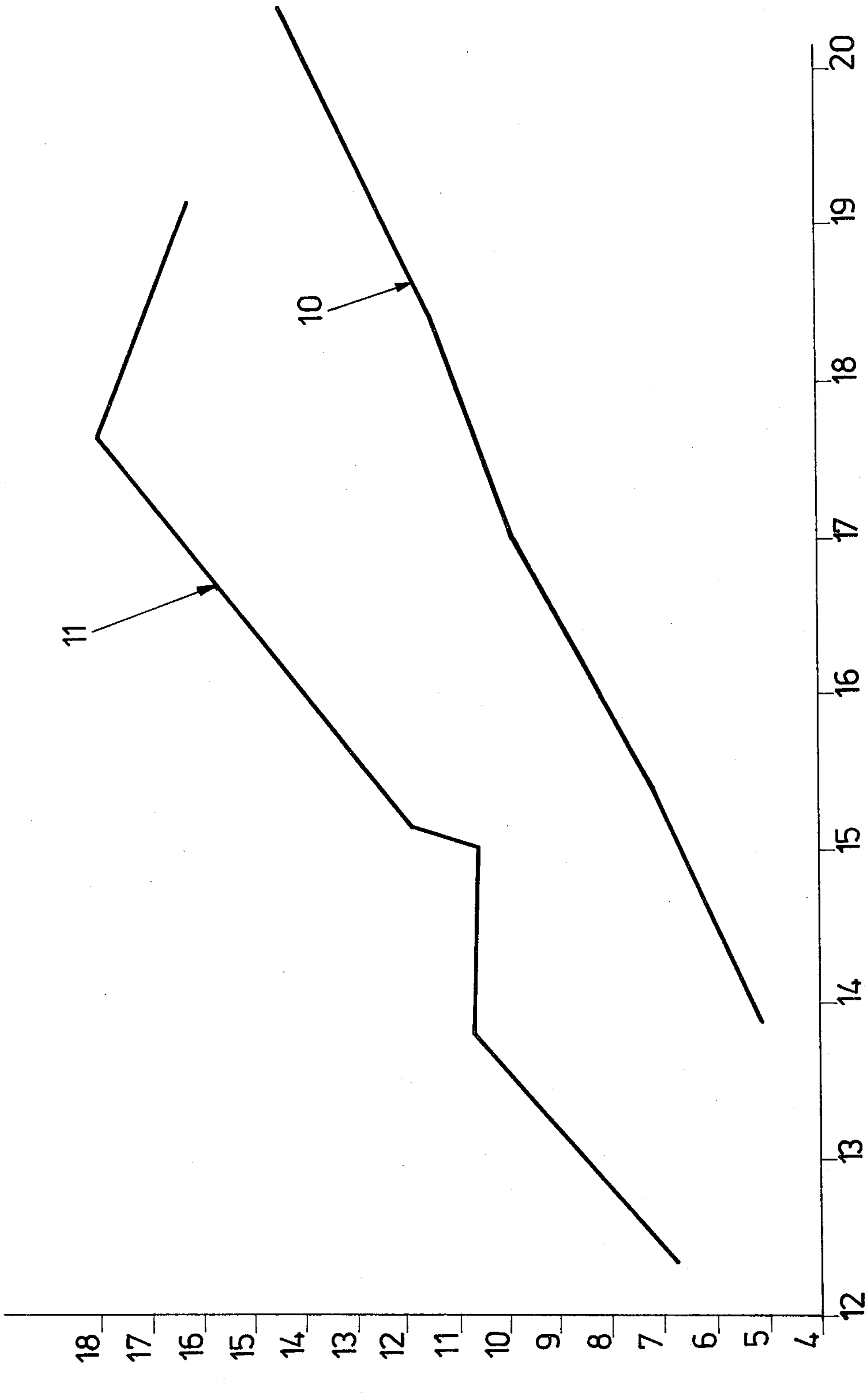
FIG. 4 is a graph of coefficient of variation of cycle-to-cycle variation againt air/fuel ratio for a commercially available automobile engine (Triumph 2.5 PI) before and after valve assembly modification.
Figure 5:
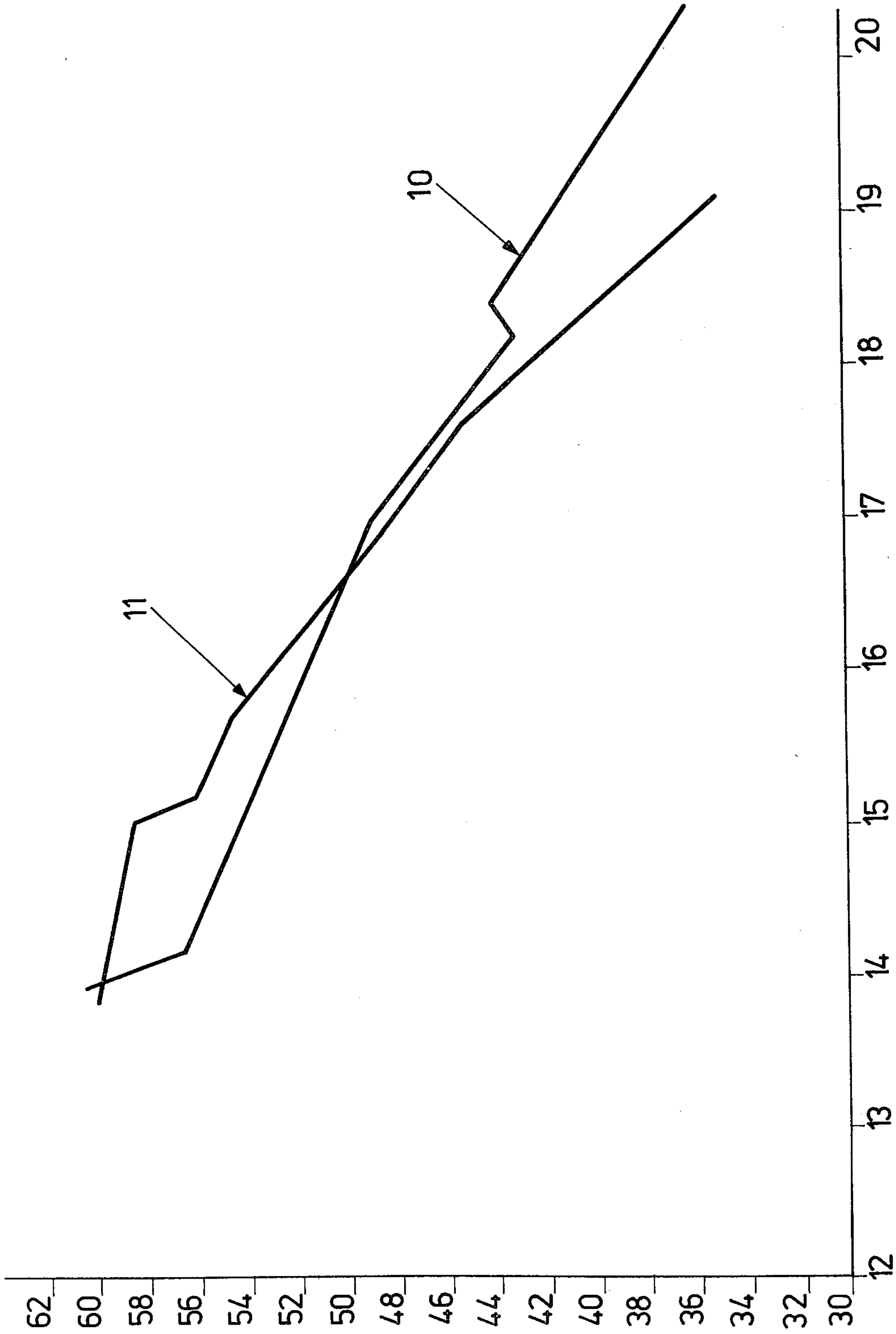
FIG. 5 is a graph of torque against air/fuel ratio for the modified and unmodified engine.
Figure 6:
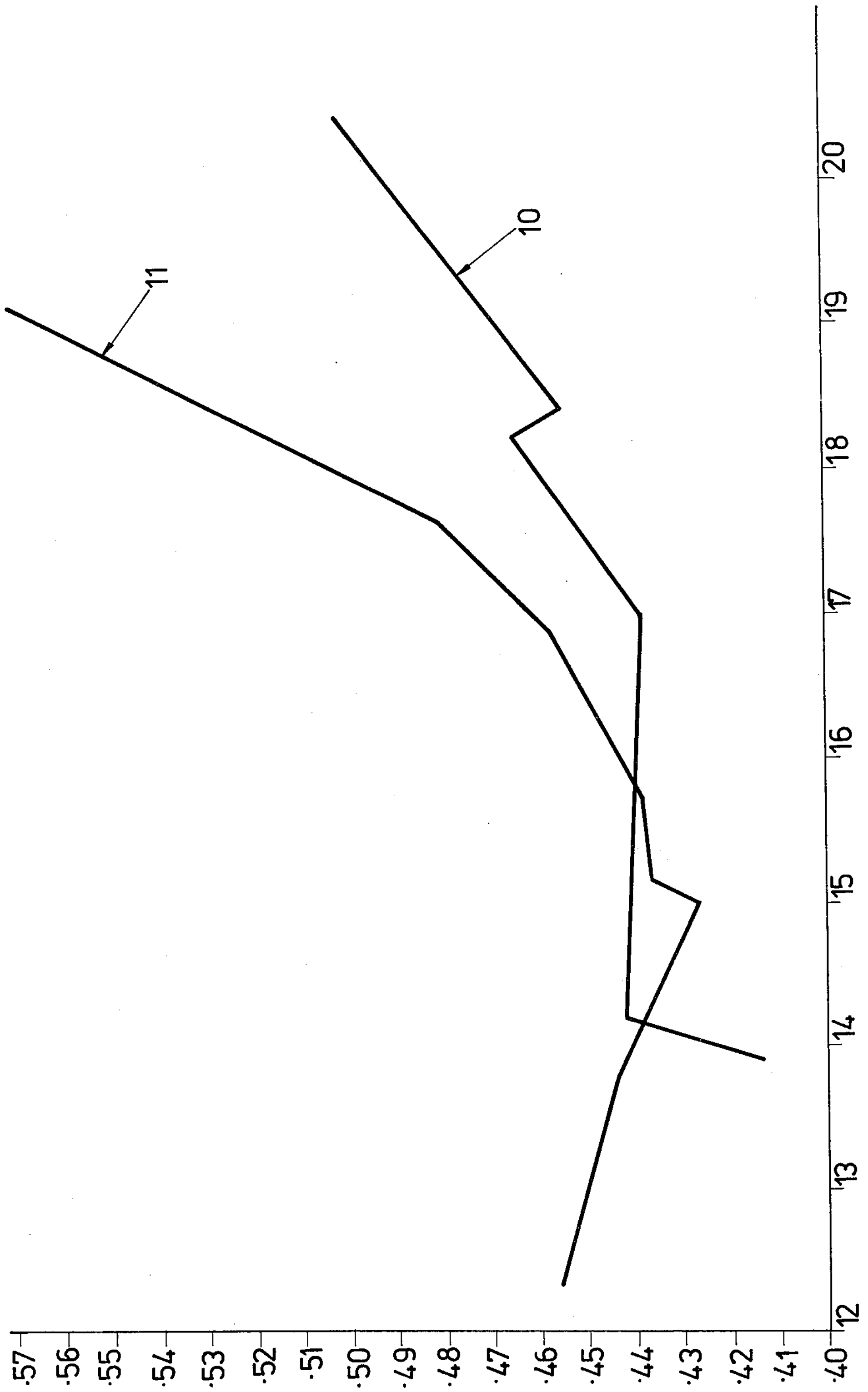
FIG. 6 is a graph of specific fuel consumption against air/fuel ratio for the modified and unmodified engine.

The relative performances of the engine when fitted with the valves 1 (lines 10 in FIGS. 4 to 6) and when fitted with the "standard" valves (lines 11 in FIGS. 4 to 6) are shown in FIGS. 4 to 6. FIG. 4 is a graph of coefficient of variation of cycle-to-cycle peak pressure (calculated as (standard deviation÷mean peak pressure)×100) as ordinate against air/fuel ratio as abscissa. FIG. 5 is a graph of torque in ft.lbs. as ordinate against air/fuel ratio as abscissa and FIG. 6 is a graph of specific fuel consumption in lbs. per brake horse power per hour against air/fuel ratio as abscissa.

It will be appreciated that in the tests reported above, the use of a naturally aspirated engine resulted in smaller mixture charge per cycle when using "basic" valve 1 or the four layer valve than when using the "standard" valves. Nevertheless, it is clear from the results of those tests that use of valves of the invention significantly increased power, reduced cycle-to-cycle variations and reduced specific fuel consumption at lean air/fuel ratios. In particular, such use enabled the engine to be run at lean mixtures of 16:1 to 20:1 which range was effectively beyond that at which the engine could run without misfiring when fitted with the original valves. It is confidently predicted that power output and fuel economy will be increased by use of a supercharger and that with a supercharger the modified engine can be run at its present compression ratio on 3 star petrol.

In a second series of tests, a Type E6 Ricardo Variable Compression Research Engine was operated under identical conditions (except where specifically stated) with an unmodified and various modified inlet valves. The performance of the engine was observed and the most relevant results plotted as the graphs shown in FIGS. 7 to 10. In each case the lines corresponding to the various valves are identified as set forth in Table I. The fuel used was 98.3 Research Octane Number.

Figure 7:
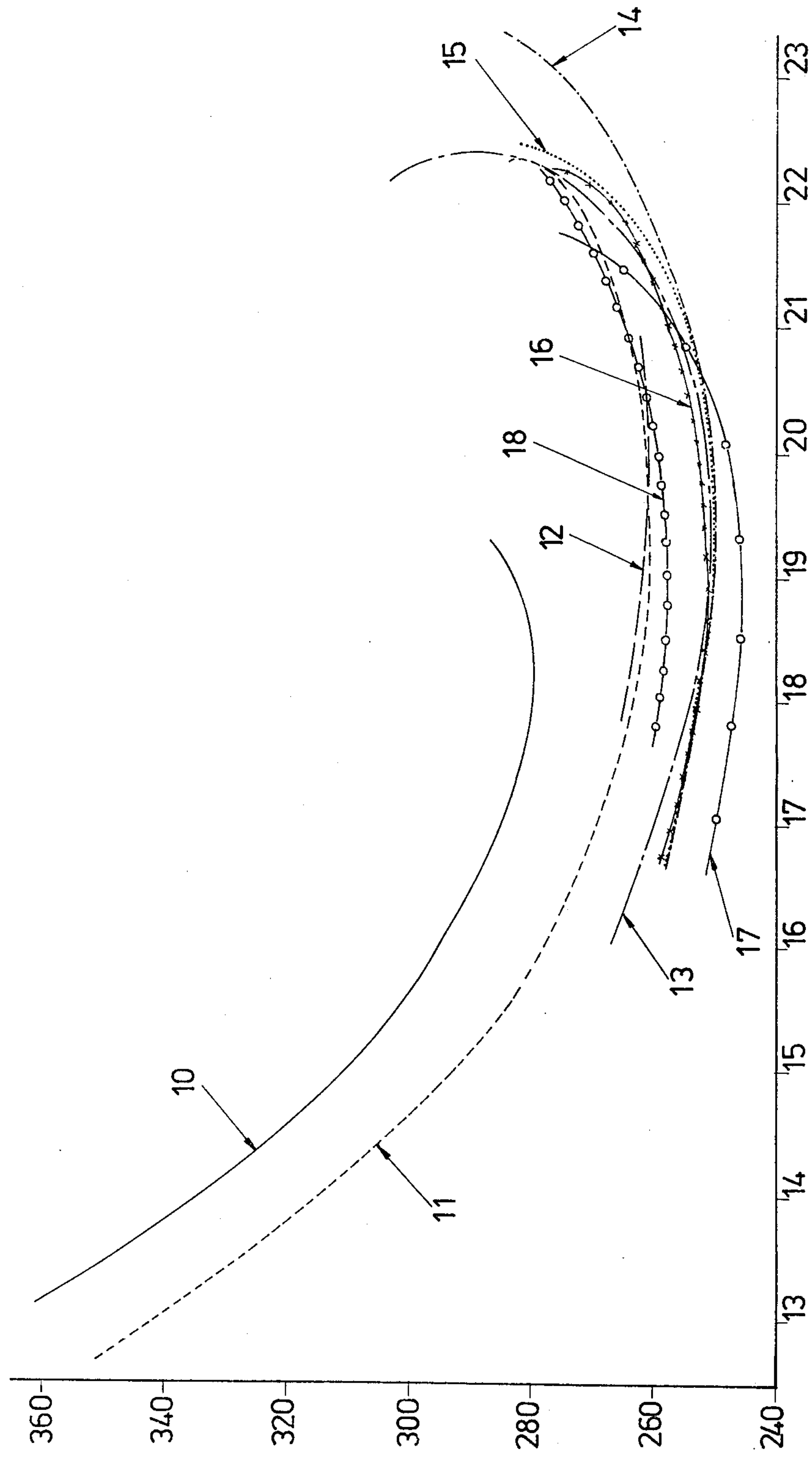
FIG. 7 is a graph of specific fuel consumption against air/fuel ratio for a single cylinder research engine when fitted with various valves.

FIG. 7 is a graph of specific fuel consumption in gms per brake horse power per hour as ordinate against air/fuel ratio as abscissa. The engine was run at 2500 r.p.m. under a load of 50 Kgs per $cm^2$ B.M.E.P. (Break mean effective pressure) at a 15:1 compression ratio (except when using the standard valve in which case the compression ratio was 9.5:1). In all cases the compression ratio used was assessed to be the optimum ratio for the engine configuration (see FIG. 9).

Figure 8:
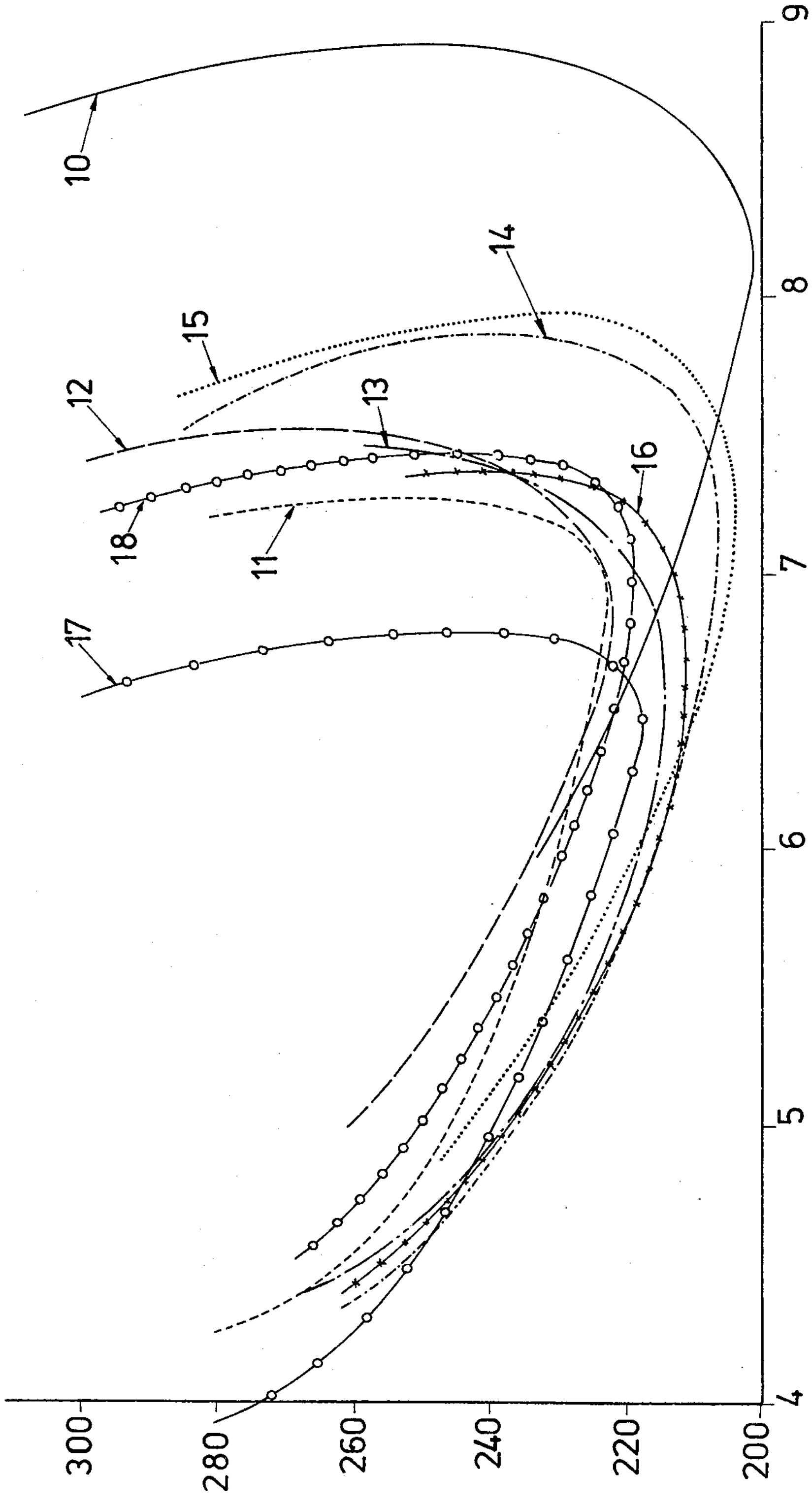
FIG. 8 is a graph of specific fuel consumption against load for the research engine.

FIG. 8 is a graph of specific fuel consumption in gms per brake horse power per hour as ordinate against maximum BMEP in Kgs per $cm^2$ as abcissa. The engine was run at 2500 r.p.m. using the compression ratios referred to above.

Figure 9:
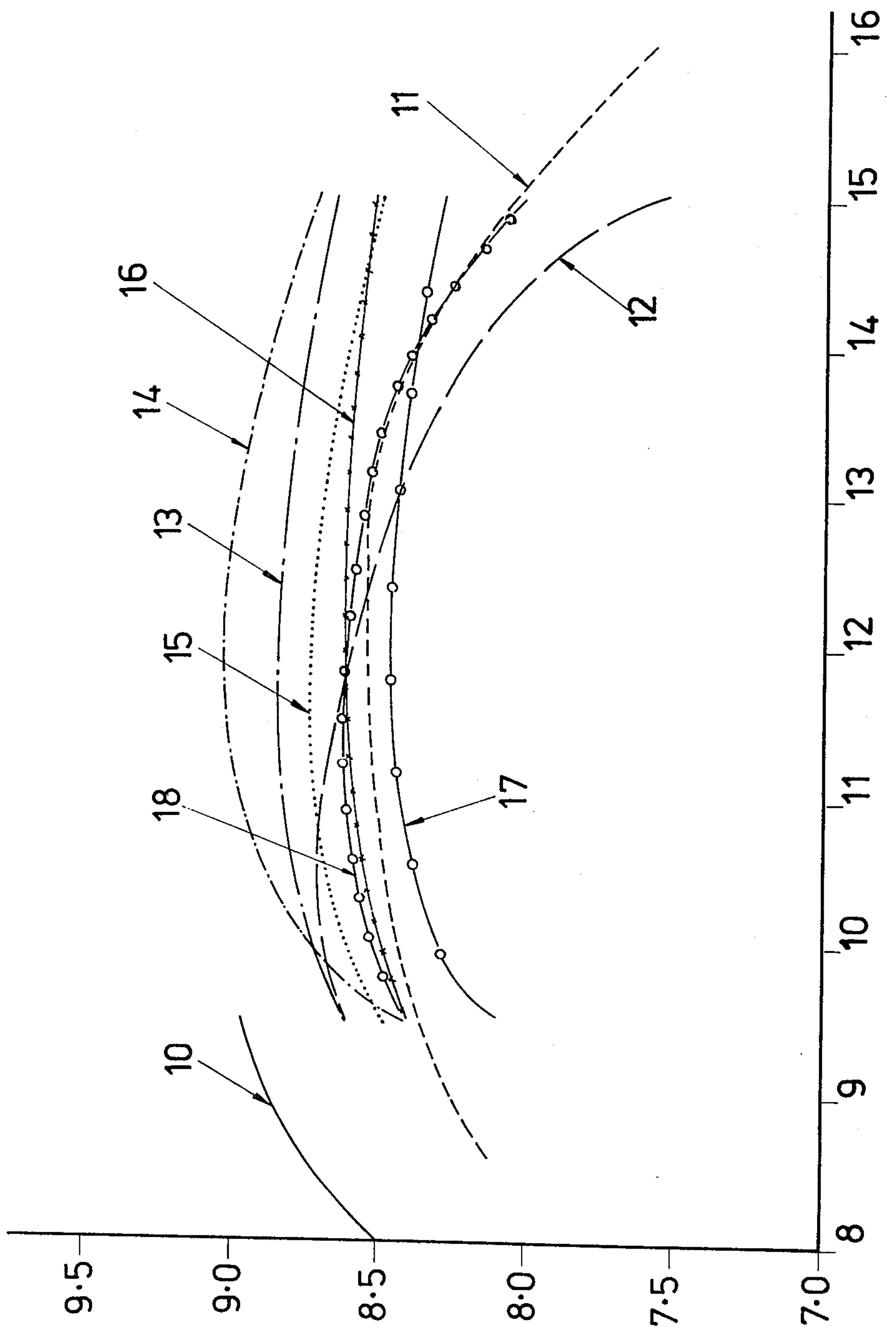
FIG. 9 is a graph of maximum load against compression ratio for the research engine.

FIG. 9 is a graph of maximum BMEP in Kgs per $cm^2$ against compression ratio for an air/fuel ratio of about 12:1 (i.e. rich) running the engine at 1500 r.p.m. at full throttle. In the cases of the "standard" and "basic" valves, the respective lines terminate at the point where the engine effectively ceased to run because of misfiring due to knocking or preignition. In all other cases, the test was terminated at a compression ratio of 15:1 without reaching the compression ratio limit.

Figure 10:
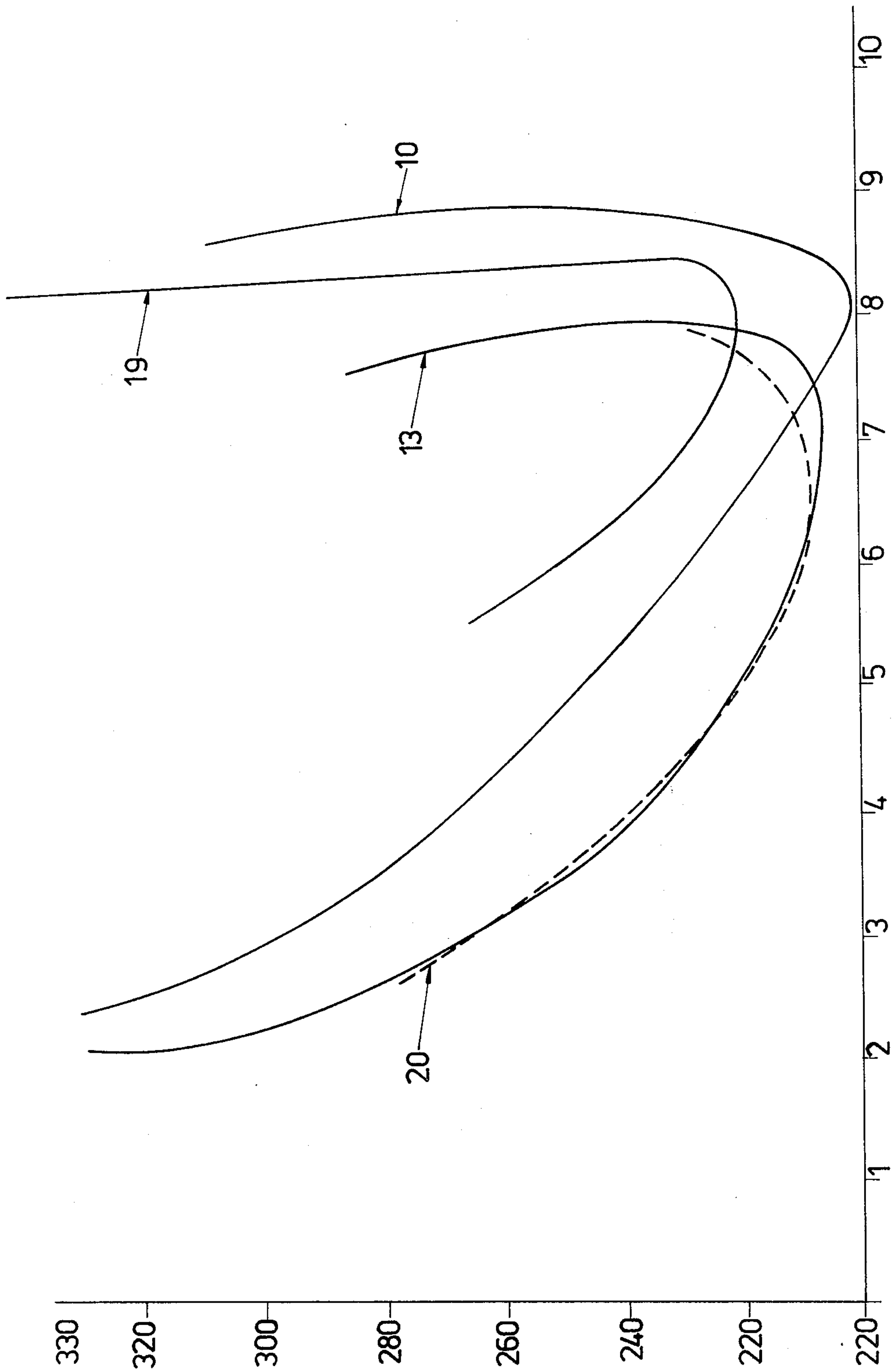
FIG. 10 is a graph of specific fuel consumption against load for the research engine showing inter alia the engine in a diesel configuration.

FIG. 10 is a graph corresponding to that of FIG. 8 but showing the respective results for the unmodified engine at a compression ratio of 8:1 (line 19) as well as at the 9.5:1 ratio (line 10), the engine fitted with valve 2 TA (line 13) at a compression ration of 15:1, and the engine in its unmodified diesel configuration (line 20) at a compression ratio of about 22:1.

It will be seen that the order of preference for the valves varies depending upon the criteria of performance being considered. Thus, the ascending order of preferences are as follows:

FIG. 7:

Std (worst); 2TS, basic; 2TA 18J; ITA 2B: 2TA 16J; 2TA; ITAFB; and 2TA2B (best);

FIG. 8:

2TA 16J (worst); basic; ITA2B; 2TA 18J; 2TA; 2TS, 2TA2B; ITAFB and Std. (best).

FIG. 9:

Std (worst); 2TS; basic; 2TA 18J; 2TA 16J; ITA2B; ITAFB; 2TA; and 2TA2B (best). However, when viewed from the overall requirement of fuel economy at light loads with acceptable power output, the final order of preference becomes:

Std (worst); 2TS; basic; 2TA 16J and 2TA 18J; ITA2B; 2TA; ITAFB and 2TA2B.

Thus, each of the modified valve assembles used were assessed to provide better performance in terms of both fuel economy and power output than the standard engine. The extent of improvement possible by using modified valve assemblies in accordance with the invention is demonstrated by the fact that the performance of the engine when fitted with valves ITAFB and 2TA2B exceeded that of the engine in its unmodified diesel configuration.

It is seen therefore that the invention provides a relatively inexpensive mechanism to significantly improving the performance of a petrol engine. The absence of the need to make any substantial engineering modifications to the engine, although some modifications are desirable, ensures that the fundamental reliability of the conventional petrol engine is retained.

Obviously numerous modifications and variations of the present invention are possible in light of the above teachings. It is to be understood, therefore, that within the scope of the appended claims, the invention may be practiced otherwise than as specifically described herein.

I claim:

1. An inlet valve assembly including a valve having a valve head, a valve stem and a valve seat for an internal combustion engine having at least one cylinder, comprising:

gas distribution means connected to said valve head for creating gas turbulence in the form of small eddies in said cylinder which decays to form a pattern of isotropic turbulence such that at the time of combustion, said small eddies are sufficiently small as to reduce cycle to cycle variation and which comprises at least one ring of separate, circumferentially spaced walls defining between them passages which serve, when the valve is open, to divide gas passing between the valve head and said seat into a plurality of circumferentially spaced jets, each of said jets having a radial component of motion, said passages having a length at least twice their width, a cross-sectional area of outlet ports of the passages being not more than a cross-sectional area of intervening wall ends and said cross-sectional area of said outlet ports of said passages being 50% to 25% of a total area between said valve and said seat in an open position wherein said walls are joined together at a base portion thereof and are open ended at a portion opposite said base portion.

2. An inlet valve assembly as claimed in claim 1, in which each of said passages has parallel sides.

3. An inlet valve assembly as set forth in claim 1, wherein each of said passages are of substantially rectangular cross-section.

4. An inlet valve assembly as claimed in claim 1, wherein a ratio of the total cross-sectional flow area of said outlet ports measured in square centimeters to a swept volume of a total portion of said cylinder measured in cubic centimeters is in the range of 80 to 150.

5. An inlet valve assembly as claimed in claim 1, in which said cross-sectional area of said outlet ports of the passages is 50% to 30% of the total area between the valve and said seat and each outlet port which is 0.05 to 0.09 inches.

6. An inlet valve assembly as claimed in claim 5, in which said outlet port cross-sectional area is 45% to 35% of said total area, each outlet port width is about 0.07 inches and each passage is inclined at about 30° to a radial direction as viewed from upstream of said valve.

7. An inlet valve assembly as claimed in claim 5, in which said passages are inclined to a radial direction in a common angular direction and by a common angle of about 30°.

8. An inlet valve assembly as claimed in claim 1, in which said passages are inclined to a radial direction at an angle of 15° to 45° as viewed from upstream of said valve.

9. An inlet valve assembly as claimed in claim 8, in which said angle is in the range of 25° to 35°.

10. An inlet valve assembly as claimed in claim 8, in which said passages are arranged in at least one layer and deviate from the radial direction in a common angular direction and by a common angle.

11. An inlet valve assembly as claimed in claim 1, in which the ratio of the total cross-sectional flow area of said outlet ports measured in square centimeters to a swept volume of a total portion of said cylinder measured in cubic centimeters is in the range of 95 to 135.

12. An inlet valve assembly as claimed in claim 11, in which the ratio of the total cross-sectional flow area of said outlet ports measured in square centimeters to a swept volume of said total portion of said cylinder measured in cubic centimeters is in the range of 105 to 125.

13. An inlet valve assembly as claimed in claim 11, in which each outlet port width is 0.05 to 0.09 inches.

14. An inlet valve assembly including a valve having a valve head, a valve stem and a valve seat for an internal combustion engine having at least one cylinder, comprising:

gas distribution means connected to said valve head for creating gas turbulence in the form of small eddies in said cylinder which decays to form a pattern of isotropic turbulence such that at the time of combustion, said small eddies are sufficiently small as to reduce cycle to cycle variation and which comprises at least one ring of separate, circumferentially spaced walls defining between them passages which serve, when the valve is open, to divide gas passing between the valve head and said seat into a plurality of circumferentially spaced jets, each of said jets having a radial component of motion, said passages having a length at least twice their width and forming outlet ports of substantially uniform width in a direction parallel to a longitudinal axis of said valve stem, a cross-sectional area of said outlet ports of the passages being not more than a cross-sectional area of intervening wall ends and said cross-sectional area of said outlet ports of said passages being 50% to 25% of a total area between said valve and said seat in an open position wherein said at least one ring further comprises a first ring connected coaxially and extending axially from an upper surface portion of said valve head, passages of said first ring deviate by an angle from a radial direction in a counterclockwise direction as viewed from upstream of said valve and a second ring connected coaxially with an upper face of said first ring and wherein passages of said second ring deviate by an angle from a radial direction as viewed from upstream of said valve in a clockwise direction.

15. An inlet valve assembly as claimed in claim 14, in which each of said passages has parallel sides.

16. An inlet valve assembly as claimed in claim 14, wherein each of said passages are of substantially rectangular cross-section.

17. An inlet valve assembly as claimed in claim 14, wherein a ratio of the total cross-sectional flow area of said outlet ports measured in square centimeters to a swept volume of a total portion of said cylinder measured in cubic centimeters is in the range of 80 to 150.

18. An inlet valve assembly as claimed in claim 14, in which said cross-sectional area of said outlet ports of the passages is 50% to 30% of the total area between the valve and said seat and each outlet port width is 0.05 to 0.09 inches.

19. An inlet valve assembly as claimed in claim 18, in which said outlet port cross-sectional area is 45% to 35% of said total area, each outlet port width is about 0.07 inches and each passage is inclined at about 30° to a radial direction as viewed from upstream of said valve.

20. An inlet valve assembly as claimed in claim 18, in which the passages are inclined to a radial direction as viewed from upstream of said valve in a common angular direction and by a common angle of about 30°.

21. An inlet valve assembly as claimed in claim 14, in which said passages are inclined to a radial direction at an angle of 15° to 45° as viewed from upstream of said valve.

22. An inlet valve assembly as claimed in claim 21, in which said angle is in the range of 25° to 35°.

23. An inlet valve assembly as claimed in claim 21, in which said passages are arranged in at least one layer and deviate from the radial direction in a common angular direction and by a common angle.

24. An inlet valve assembly as claimed in claim 14, in which the ratio of the total cross-sectional flow area of said outlet ports measured in square centimeters to a swept volume of a total portion of said cylinder measured in cubic centimeters is in the range of 95 to 135.

25. An inlet valve assembly as claimed in claim 24, in which the ratio of the total cross-sectional flow area of said outlet ports measured in square centimeters to a swept volume of said total portion of said cylinder measured in cubic centimeters is in the range of 105 to 125.

26. An inlet valve assembly as claimed in claim 24, in which each outlet port width is 0.05 to 0.09 inches.

27. An inlet valve assembly including a valve having a valve head, a valve stem and a valve seat for an internal combustion engine having at least one cylinder, comprising:

gas distribution means connected to said valve head for creating gas turbulence in the form of small eddies in said cylinder which decays to form a pattern of isotropic turbulence such that at the time of combustion, said small eddies are sufficiently small as to reduce cycle to cycle variation and which comprises at least one ring of separate, circumferentially spaced walls defining between them passages which serve, when the valve is open, to divide gas passing between the valve head and said seat into a plurality of circumferentially spaced jets, each of said jets having a radial component of motion, said passages having a length at least twice their width, a cross-sectional area of outlet ports of the passages being not more than a cross-sectional area of intervening wall ends and said cross-sectional area of said outlet ports of said passages being 50% to 25% of a total area between said valve and said seat in an open position wherein said walls radially outwardly increase in width.

28. An inlet valve assembly as claimed in claim 27, in which each of said passages has parallel sides.

29. An inlet valve assembly as claimed in claim 27, wherein each of said passages are of substantially rectangular cross-section.

30. An inlet valve assembly as claimed in claim 27, wherein a ratio of the total cross-sectional flow area of said outlet ports measured in square centimeters to a swept volume of a total portion of said cylinder measured in cubic centimeters is in the range of 80 to 150.

31. An inlet valve assembly as claimed in claim 27, wherein said at least one ring further comprises:

a first ring connected coaxially and extending axially from an upper surface portion of said valve head wherein passages of said first ring deviate by an angle from a radial direction in a counterclockwise direction as viewed from upstream of said valve; and a second ring connected coaxially with an upper face of said first ring wherein passages of said second ring deviate by an angle from a radial direction as viewed from upstream of said valve in a clockwise direction.

32. An inlet valve assembly according to claim 27, wherein said at least one ring further comprises:

a first ring connected coaxially and extending axially from an upper surface portion of said valve head wherein passages of said first ring deviate by an angle from a radial direction in a clockwise direction as viewed from upstream of said valve; and a second ring connected coaxially with an upper face of said first ring wherein passages of said second ring deviate by an angle from a radial direction as viewed from upstream of said valve in a clockwise direction.

33. An inlet valve assembly as claimed in claim 27, in which said cross-sectional area of said outlet ports of the passages is 50% to 30% of the total area between the valve and said seat and each outlet port width is 0.05 to 0.09 inches.

34. An inlet valve assembly as claimed in claim 33, in which said outlet port cross-sectional area is 45% to 35% of said total area, each outlet port width is about 0.07 inches and each passage is inclined at about 30° to a radial direction as viewed from upstream of said valve.

35. An inlet valve assembly as claimed in claim 33, in which said passages are inclined to a radial direction in a common angular direction and by a common angle of about 30°.

36. An inlet valve assembly as claimed in claim 27, in which said passages are inclined to a radial direction at an angle of 15° to 45° as viewed from upstream of said valve.

37. An inlet valve assembly as claimed in claim 36, in which said angle is in the range of 25° to 35°.

38. An inlet valve assembly as claimed in claim 36, in which said passages are arranged in at least one layer and deviate from the radial direction in a common angular direction and by a common angle.

39. An inlet valve assembly as claimed in claim 27, in which the ratio of the total cross-sectional flow area of said outlet ports measured in square centimeters to a swept volume of a total portion of said cylinder measured in cubic centimeters is in the range of 95 to 135.

40. An inlet valve assembly as claimed in claim 39, in which the ratio of the total cross-sectional flow area of said outlet ports measured in square centimeters to a swept volume of said total portion of said cylinder measured in cubic centimeters is in the range of 105 to 125.

41. An inlet valve assembly as claimed in claim 39, in which each outlet port width is 0.05 to 0.09 inches.

* * * * *